(12) United States Patent
Drake

(10) Patent No.: US 8,176,332 B2
(45) Date of Patent: May 8, 2012

(54) COMPUTER SECURITY USING VISUAL AUTHENTICATION

(76) Inventor: Christopher Nathan Drake, Copacabana (AU)

( * ) Notice: Subject to any disclaimer, the term of this patent is extended or adjusted under 35 U.S.C. 154(b) by 1419 days.

(21) Appl. No.: 11/707,590

(22) Filed: Feb. 15, 2007

(65) Prior Publication Data

US 2008/0201578 A1 Aug. 21, 2008

(51) Int. Cl.
*G06F 21/00* (2006.01)
(52) U.S. Cl. .......................................... 713/184; 713/185
(58) Field of Classification Search ........... 713/182–185
See application file for complete search history.

(56) References Cited

U.S. PATENT DOCUMENTS

| | | | | |
|---|---|---|---|---|
| 6,804,786 | B1 * | 10/2004 | Chamley et al. | 726/20 |
| 2002/0112170 | A1 * | 8/2002 | Foley et al. | 713/184 |
| 2003/0177366 | A1 * | 9/2003 | de Jong | 713/184 |
| 2005/0010785 | A1 * | 1/2005 | Abe et al. | 713/182 |
| 2006/0156385 | A1 * | 7/2006 | Chiviendacz et al. | 726/2 |
| 2006/0230435 | A1 * | 10/2006 | Kokumai | 726/4 |
| 2007/0215693 | A1 * | 9/2007 | M'Raihi | 235/380 |

* cited by examiner

*Primary Examiner* — Gilberto Barron, Jr.
*Assistant Examiner* — David Le
(74) *Attorney, Agent, or Firm* — Marian J. Furst; Craig W. Barber

(57) ABSTRACT

A physical token to the user in the form of a unique card having a grid of images thereon. Each column and row of images has a unique text string of text. In addition, each user knows a special image, not necessarily present on the token card, on which one particular point or zone functions as an extra authentication feature. Users may be queried for a username, then shown a random one of the images on their card, and asked for the row text string plus column text string identifying the image. Users are also prompted to select their particular point or zone within their known special image, which is displayed, among a jumble of other images, by the computer system requesting authorization, such display serving to authenticate the computer system to the user. The system may be combined with password protection and methods to identify a user's machine.

11 Claims, 3 Drawing Sheets

COMPUTER SECURITY USING VISUAL AUTHENTICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to computer security, and specifically to visual authentication.

STATEMENT REGARDING FEDERALLY FUNDED RESEARCH

This invention was not made under contract with an agency of the US Government, nor by any agency of the US Government.

BACKGROUND OF THE INVENTION

When computers were invented decades ago, most authentication consisted of users keying in a username and password to gain system access. Today, little has changed—the users type in a username (or the email address) and the password to log in. Some improvements to this traditional login have appeared, such as secure keyboards, smartcards, electronic tokens, biometric scanners, SSL encryption, Turing anti-robot challenges, virus scanners, anti-spyware tools, and keylogger protection. Unfortunately, hackers and their technology have readily adapted, and they enjoy little resistance to their widespread theft of usernames and passwords, or their hijacking of login sessions, credit cards, and bank accounts. Hackers use tricks and tools like viruses, Trojan-horses, worms, spyware, software keyloggers, hardware key-press recorders, phishing attacks, spoof web sites, confidence tricks, dictionary attacks, and numerous other security exploits.

Computers and the internet are increasingly relied upon to handle valuable information, and hence are increasingly targeted by criminals. It is now very important to secure the login process and protect peoples usernames and passwords.

It would be preferable to utilize standards-based technology (a mouse, keyboard, and web browser) to secure the login process, without requiring additional software to be deployed on a user's computer.

Threat 1—Phishing—a confidence trick whereby the attacker attempts to lure a victim into revealing their usernames and password (usually, but not always, by trying to get them to log in to a spoof or fake look-alike web site)—is the most widespread and successful attack method plaguing the internet today.

This threat succeeds because victims are unaware that they are revealing their passwords etc to the wrong place—which is a result of the security oversight made by their provider: the victim has not been given an easy nor foolproof way to verify that the request for their password comes from the legitimate place (eg: their bank or their online auction provider etc).

It would be preferable to introduce easy and foolproof protection to verify such requests (that is—two-way authentication, so called because the computer authenticates to the user, as well as the user authenticating to the computer), as well as providing keylogger/spyware protection and secure 2-factor authentication (the first factor being something the user knows, which is their password, the second factor being something the user has, which is usually a physical hardware token).

Threat 2—Keyloggers (software and hardware) and security-targeted Viruses, Spyware, Trojans, and Worms are all automatic programs designed to steal usernames and passwords. These programs are installed automatically via operating system vulnerabilities, or via confidence trickery such as phishing, or indeed via any other method the perpetrators can dream up. They all rely on their ability to steal passwords, and the fact that stolen passwords can later be used successfully by the hacker.

It would be advantageous to overcome these threats by providing a non-traditional and thus difficult-to-steal graphical element as part of a user's password, as well as providing for single-use passwords that, if stolen, cannot later be used again.

Threat 3—Careless user's—it is often said (but not true) that no amount of security can protect people from their own mistakes: things like writing down their passwords on paper, telling other people what their passwords are, or choosing easy-to-guess passwords.

It would be advantageous to provide a strong level of protection to everyday user's in a way that is easy enough to use that users themselves barely notice they're being protected from their own mistakes.

Threat 4—Denial of Service (DoS) attacks—are a type of indirect threat in which a particular user is denied access to a server computer account by the older security software of the server computer itself. This type of attack works as follows: the attacker obtains or guesses the username of the person who's access to be denied. The attacker then repeatedly accesses the authentication/login page of the server computer and repeatedly enters the username of the victim, along with a bogus password. After a certain number of such efforts, the server security software notices that the username of the victim is being attacked by multiple login attempts, despite the fact that the attacker has no realistic desire to access the service. The security software then cuts off access to that username and the attacker ceases the attack. When the victim of the attack next attempts to access the service, they are denied service by the security software, which has no method of differentiating the real user (the victim) from the attacker.

It would be advantageous to provide a method of preventing denial of service attacks from accessing the real authentication/login page of the victim.

SUMMARY OF THE INVENTION

General Summary

The preferred embodiment of the invention consists of (1) a physical token and (2) an on-screen graphical login process. The token is a printed paper or plastic card the same size as a credit-card, which can be stored in a wallet or purse. FIG. 1 depicts an example token. Printed on the card is a grid of small random different postage-stamp-sized photographs arranged into rows and columns. Each row and column is labeled with a heading that consists of one or more random alphanumeric characters. An example token might be printed with 5 columns and 4 rows, which is 20 different photos altogether. The second column might be labeled "s1F" and the fourth row might be labeled "Fzs". The photo on the 4th row in the 2nd column might be a butterfly. No 2 cards are ever the same—every user has a different grid of photos and different labels. When a user needs to log in, they first enter their username (not their password) then the site chooses one of the pictures it knows to be on this user's token—for example—it might display a butterfly with the instruction "What are the row and column labels on your token corresponding to this picture". The user locates the picture on their token, and types in the required response (eg: "s1FFzs"—their token code for this login) reach step 2 of the log in process—the on-screen graphical login.

When the user was originally granted a login account to use, they will have been provided with a username, a token, and then asked to choose a secret password. (Identifying information from such user may be in the form of one member selected from the group consisting of: a cookie, a token, an email address, a username or combinations thereof) In the preferred embodiment of this invention, they will also have been shown a selection of 16 small random photographs on their computer screen, and will have been required to choose one of them to be their secret login photo, and to choose a particular spot in that photo to be their secret photo point. For example—they might have picked a photograph of a dog as their secret photo, and the nose of the dog as their secret photo point. The login process completes with the user being shown a jumbled-up grid of photographs on their screen, and being required to type in their traditional password, then locate their secret photo and click on their secret photo point to complete their log in. The user may decline continuation of authentication, in the event the computer, or an imposter computer system, is unable to provide any image shown on the card body: an automatic alert to the user that the server computer may be an imposter system.

Thus the complete login sequence is as follows: the user enters their username, then finds a picture on their token and keys in the code for the picture, keys in their password, and then clicks on their secret photo point.

Security is enhanced because no fake or spoof site is able to know what photos are on the user's token, or what photo contains a user's secret photo point—thus preventing the user from being able to be tricked into logging in to the wrong place.

Security is also enhanced because no existing malware (keylogger, virues, spyware, etc) is able to steal a user's password because it consists of elements that do not repeat (the token codes, eg—the butterflys' code, should not be requested for at least 39 subsequent logins [using double-sided tokens], and if required, the token may be discarded to ensure that codes never repeat) as well as an arbitrary mouse-click at a predetermined point on the user's screen, which itself does not repeat either (the jumbled-up grid of photographs are jumbled differently for each login), and additional standards-based technology is also available to prevent malware from capturing a "print" of the screen, thus also preventing the theft of the user's photopoint itself.

Security is also enhanced because users are protected against their own mistakes, like (A) writing down passwords—because a token is also required to complete a login, and it is also physically difficult for people to write down pictures of things and identify their secret photo points therein, and (B) telling people passwords because (excluding the simplistic dog-nose example) it's usually going to be difficult to describe in words which particular photo and what point in it contains the user's secret photo point, and (C) picking the same or obvious passwords is likely to be impossible: no 2 users, and not even the same user 2 times in a row will see the same selection of 16 photos to pick a secret photo point from (blocking them choosing the same) and in the vast majority of cases, it will be unlikely that a secret point the user selects from 16 photos will be obvious to someone else.

Security is also enhanced by yet another advantage of the invention, the fact that users are not initially prompted for their password but only for their username, and any denial of service attack using multiple "guessed" image codes merely alerts the server software to the DoS attack, or even possibly to begin showing pictures which do not in fact have ANY correct image from the physical token thereon. The attacker thus never has the opportunity to get to the page requiring the real password and is thus unable to make multiple incorrect guesses to deny service.

Yet another advantage of the present invention is that it utilizes standards-based technology (a mouse, keyboard, printer, and web browser) to secure the login process, without requiring additional software to be deployed on a user's computer.

This invention also introduces an easy and foolproof protection to verify that login requests originate from legitimate (not spoofed) servers (that is—two-way authentication), as well as providing secure 2-factor authentication and keylogger/spyware protection.

This invention has yet another advantage in that it overcomes these threats by providing a non-traditional and thus difficult-to-steal graphical element as part of a user's password, as well as providing for single-use passwords that, if stolen, cannot later be used again.

This invention further has the advantage of providing a strong level of protection to everyday users in a way that is easy enough to use that users themselves barely notice they're being protected from their own mistakes.

This invention further has the advantage of preventing denial of service attacks, since incorrectly guessed token codes need not be cause to suspend a victims account, and an attacker has no way to verify whether a guessed token code is right or wrong.

SUMMARY IN REFERENCE TO CLAIMS

It is therefore yet another aspect, advantage, objective and embodiment of the invention, in addition to those discussed previously, to provide a computer security device of the physical token type (hereafter referred to as "Summary Token"), this computer security device comprising:

a card body of durable material, the card body having at least first and second sides, at least one side of the body having thereon at least first and second columns and at least first and second rows intersecting the first and second columns;

the first column having a first random indicia associated therewith, the second column having a second random indicia associated therewith, the first row having a third random indicia associated therewith, the second row having a fourth random indicia associated therewith, whereby at least four intersections of the rows and columns are provided upon the card body;

each intersection having there at a unique image.

It is therefore yet another aspect, advantage, objective and embodiment of the invention, in addition to those discussed previously, to provide a computer security device of the physical token type, this computer security device comprising: wherein the card body has a length and a width, the length and width selected to fit inside standard wallet compartments.

It is therefore yet another aspect, advantage, objective and embodiment of the invention, in addition to those discussed previously, to provide a computer security device of the physical token type, wherein the length is 3 and ⅜ inches and the width is 2 and ⅛ inches.

It is therefore yet another aspect, advantage, objective and embodiment of the invention, in addition to those discussed previously, to provide a method of authentication of a computer to a user, and a user to a computer, the method comprising:
- a) providing to such a user a card body of durable material, the card body having at least first and second sides, at least one side of the body having thereon at least first and second columns and at least first and second rows intersecting the first and second columns; the first column having a first random indicia associated therewith, the second column having a second random indicia associated therewith, the first row having a third random indicia associated therewith, the second row having a fourth random indicia associated therewith, whereby at least four intersections of the rows and columns are provided upon the card body; each intersection having thereat a unique image, and further providing to such user a username associated with such user and with the card body;
- b) displaying for such user a username-screen, for accepting from such user a first username;
- c) displaying for such user a token-screen having thereon at least one of the images from the card body, the token-screen requesting input of the indicia associated with the displayed image;
- d) allowing such user to decline continuation of authentication, in the event the computer, or an imposter computer system, is unable to provide any image shown on the card body;
- e) comparing the inputted indicia with the indicia known by the computer system to identify the image from the card body that was shown to the user;
- f) if the indicia matches, then accepting this authentication request from such user, or, proceeding to additional authentication steps.

It is therefore yet another aspect, advantage, objective and embodiment of the invention, in addition to those discussed previously, to provide a method of authentication of a computer to a user, and a user to a computer, the method comprising: further comprising the steps of:
- b1) before providing the username-screen of step b), first checking for the existence of persistent identifying information such as a cookie, bookmark, or client certificate on the user's computer;
- b2) using such persistent identifying information to derive the user's username without requiring the user to key it in;
- b3) skipping step b) and proceeding directly to step c).

It is therefore yet another aspect, advantage, objective and embodiment of the invention, in addition to those discussed previously, to provide a method of authentication of a computer to a user, and a user to a computer, the method comprising:
- a) showing to such user an assortment of random images;
- b) accepting from such user the selection of one of the shown random images to be the user's secret login photo;
- c) accepting from such user the additional pre-selection of any particular point within the user's secret login photo to be the user's secret photo point;
- d) later, as part of an authentication procedure, accepting identifying information from such user, in the form of one member selected from the group consisting of: a cookie, a token, an email address, a username or combinations thereof,
- e) activating a secret photo point selection display and input screen upon which the user's secret login photo is displayed;
- f) allowing such user to decline continuation of authentication, in the event the computer, or an imposter computer system, is unable to display the user's secret login photo;
- g) accepting such user's selection of a point somewhere on the screen;
- h) comparing the selected point on the screen to the pre-selected known secret photo point for the user;
- i) if the selection closely matches the pre-selected photo point, allowing the user to authenticate, or proceed to additional authentication steps.

It is therefore yet another aspect, advantage, objective and embodiment of the invention, in addition to those discussed previously, to provide a method of authentication of a computer to a user, and a user to a computer, the method comprising: wherein step g) further comprises:
additionally accepting from such user a password.

It is therefore yet another aspect, advantage, objective and embodiment of the invention, in addition to those discussed previously, to provide a method of authentication of a computer to a user, and a user to a computer, the method comprising:
- a) providing to such a user a card body of durable material, the card body having at least first and second sides, at least one side of the body having thereon at least first and second columns and at least first and second rows intersecting the first and second columns; the first column having a first random indicia associated therewith, the second column having a second random indicia associated therewith, the first row having a third random indicia associated therewith, the second row having a fourth random indicia associated therewith, whereby at least four intersections of the rows and columns are provided upon the card body; each intersection having thereat a unique image, and further providing to such user a username associated with such user and with the card body;
- b) showing to such user an assortment of random images;
- c) accepting from such user the selection of one of the shown random images to be the user's secret login photo;
- d) accepting from such user the additional pre-selection of any particular point within the user's secret login photo to be the user's secret photo point;
- e) later, as part of an authentication procedure, displaying for such user a username-screen, for accepting from such user their username;
- f) displaying for such user a token-screen having thereon one of the images on the card body, the token-screen requesting input of the indicia identifying the displayed image;
- g) allowing such user to decline continuation of authentication, in the event the computer, or an imposter computer system, is unable to provide any image shown on the card body;
- h) comparing the inputted indicia with the indicia known by the computer system to identify the image from the card body that was shown to the user;

i) if the indicia matches, displaying for such user a secret photo point selection screen upon which the user's secret login photo is displayed;
j) allowing such user to decline continuation of authentication, in the event the computer, or an imposter computer system, is unable to display the user's secret photo;
k) accepting such user's selection of a point somewhere on the screen;
l) comparing the selected point on the screen to the preselected known secret photo point for the user;
m) if the selection closely matches the pre-selected photo point, allowing the user to authenticate, or proceed to additional authentication steps.

It is therefore yet another aspect, advantage, objective and embodiment of the invention, in addition to those discussed previously, to provide a computer security device of the physical token type, this computer security device comprising:

a card body of durable material, the card body having at least first and second sides, one or more sides of the body having thereon at least first and second columns and at least first and second rows intersecting the first and second columns, whereby at least four intersections of the rows and columns are provided upon the card body;

each intersection having thereat a unique image;

each unique image identified uniquely with individual random indicia associated thereto.

It is therefore yet another aspect, advantage, objective and embodiment of the invention, in addition to those discussed previously, to provide a computer security device of the physical token type, this computer security device comprising: wherein the card body has a length and a width, the length and width selected to fit inside standard wallet or purse compartments.

It is therefore yet another aspect, advantage, objective and embodiment of the invention, in addition to those discussed previously, to provide a computer security device of the physical token type, this computer security device comprising: wherein the length is 3 and ⅜ inches and the width is 2 and ⅛ inches.

BRIEF DESCRIPTION OF THE DRAWINGS

FIG. 2 is an example screen which requests a token code from a user. It displays one random image selected from the user's token, and requests the row and column indicia to be keyed in.

Figure 1:
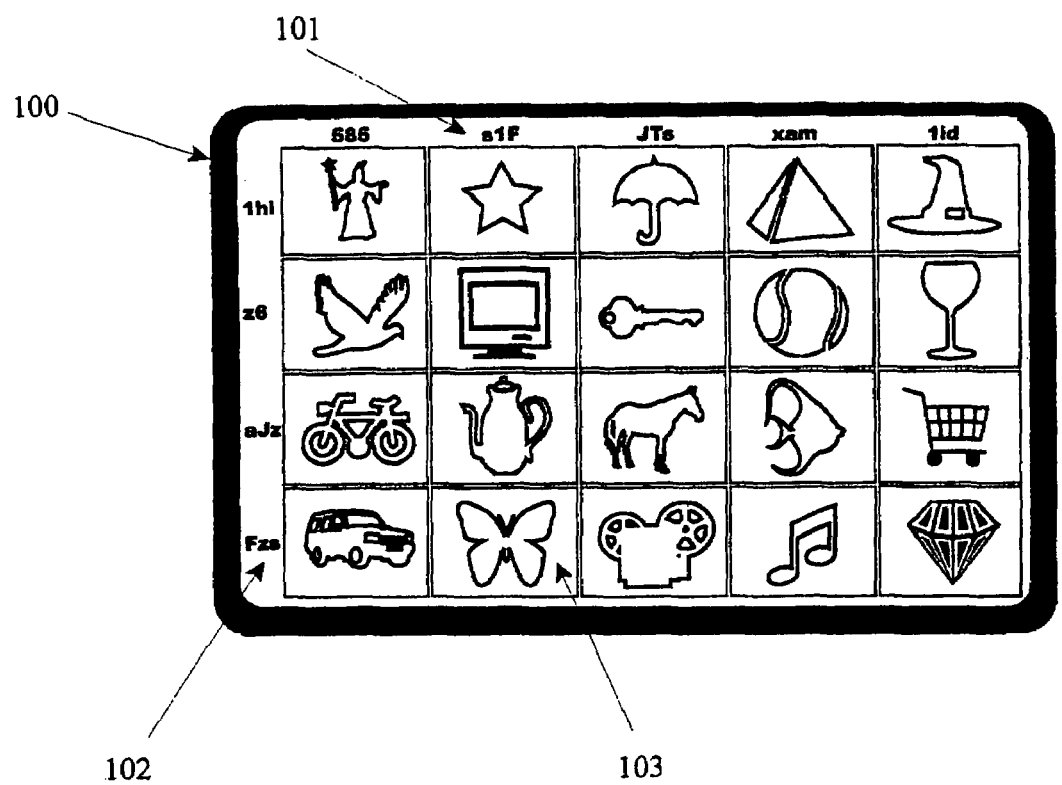
FIG. 1 is a diagram of one side of a physical token card according to an embodiment of the invention, showing the multiple images on the token card and the random row and column headings therewith.

Not shown is a first screen which requests a username from a user. Such a screen consists simply of an input area for a user to key in their username.

INDEX OF REFERENCE NUMERALS

100 A sample token card with 20 assorted random photos printed on it
101 Column heading, alphanumerica indicia "s1F"
102 Row indicia, alphanumerica indicia "Fzs"
103 Intersection of the second column and fourth row, an image of a butterfly
200 Sample computer screen display, requesting input indicia from a token
201 Output display box
202 Image of the same butterfly
203 Row/column input box, for example, for "S1FFzs"
300 Display, requesting user input of their password, and secret photo point
301 Output display box showing username they entered on an earlier screen
302 Input box for a user to key in traditional password
303 A jumbled grid of photos, including user's secret login photo
304 Dog image, which is the example user's secret login photo
305 Nose of the dog, which is the example user's secret photo point.

DETAILED DESCRIPTION

Table I is a flow chart of a first embodiment of the invention, showing one possible authentication sequence. Note that the authentication steps shown are merely one possible ordering of the steps.

Table I
1. Provide user with username, "Summary Token", password, and secret photo point
2. Accept incoming authentication request and optional cookie from user
3. Display Username screen
4. Accept Username Input from User
5. Display Token Screen including one image from "Summary Token"
6. Accept row and column indicia input from user
7. Compare inputted indica with correct answer
8. If wrong, indefinitely display fake bogus photo point screen
9. If correct, display input password screen and user's secret login photo
10. Accept user's keyed password, and mouse click on secret point in secret login photo.
11. If wrong, do not authenticate user
12. If correct, Authenticate user.

However, it should be understood that these steps may be altered substantially, both in terms of ordering and potential omissions or additions.

In greater detail, the steps of the method of the invention are as follows:

An issuing entity provides a token card, a secret image, password and a username (step 1). The secret image and username, and a password, may be selected by the user, by the issuing entity associated with the server, or may be by mutual agreement. These may be provided online or offline.

The physical token card will be an actual card, paper, photograph, physical indicia of a non-printed nature such as braille dots, and so on, and is not restricted to being printed material. In the best mode now contemplated and the preferred embodiment, the issuing/server organization may print the token card and send it to the user, however, it may in embodiments be provided online for printing by the user. While this at first thought defeats the purpose of a token at all, it will be understood that only a single secure session is required to provide the token, and that this session may occur in conjunction with the user applying for an account, or in conjunction with the user telephoning the issuing/server organization and so on. While use of tokens with grids in security has been known, the use of images in grids is not known in the prior art, and the use of grids with labels is not known in the prior art.

In addition to the actual token card, the organization and the user may also agree on a single correct "secret login photo" image, that is, an image which functions partially as a password, and in addition, the organization and the user may select a single point or zone within the security image, a "secret photo point", which further functions as a password. While use of images in security has been known, the use of a single point or zone on an image for user authentication is not known in the prior art.

The server may then check (step 2) for persistent identifying information, for example, a previously placed cookie on the computer of the user, a certain file or the like, a client certificate, a bookmark and so on, and if the persistent identifying information is located, then further steps of the process may optionally be skipped, altered or added. By this means, the user may have a combination of flexibility and security which depends on circumstances. For example, if the user customarily accesses the server from a single computer, that may allow reduction of the number of steps in the process when access is requested from that particular machine.

The server may then accept a username (steps 3 and 4) from the user.

Figure 2:
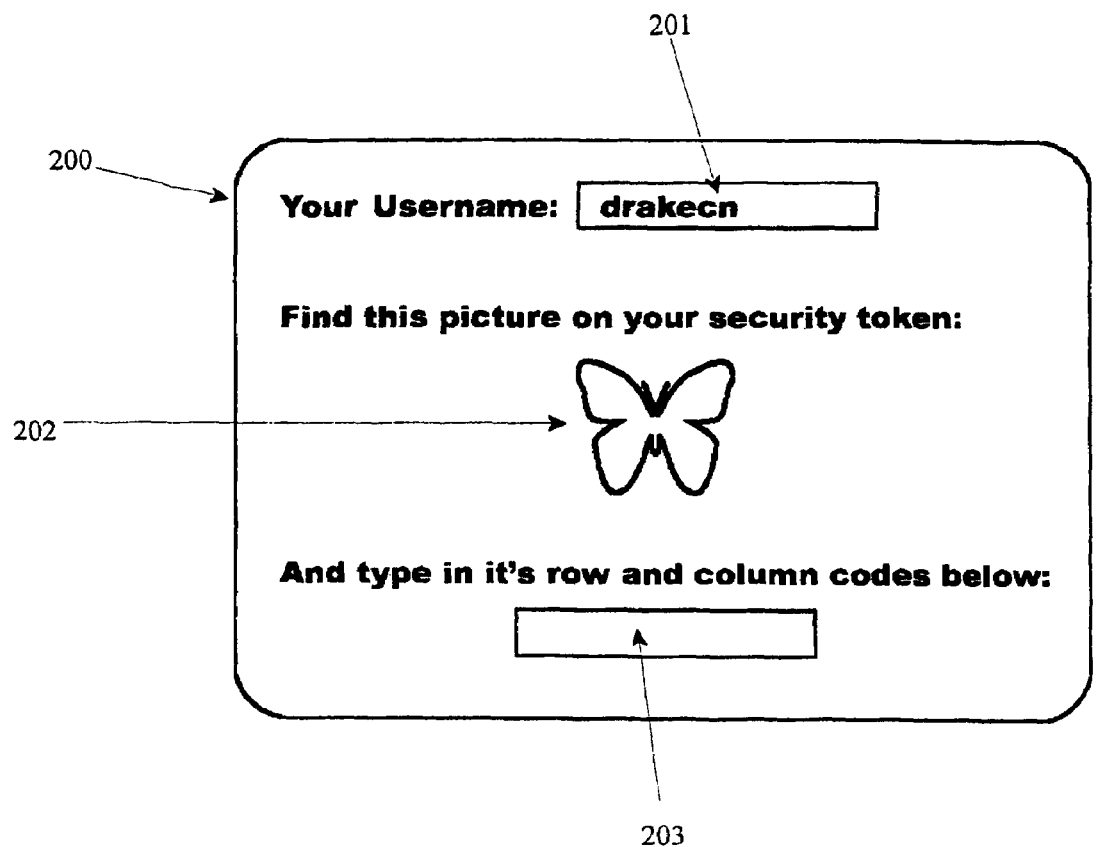

Display of one token card image (step 5, and FIG. 2) is a step unique to the invention. The computer system requesting authentication shows to the user a single image from their token. Note that the user may be supplied with a number of images. In the best mode now contemplated, the user is supplied with only a single image from the token, however, in alternative embodiments, more than one token image may be offered, with correct responses required for only one, or for more than one, of the images offered. In yet other alternative embodiments, the user may be offered a number of images, of which only one is actually to be found on the token card. Note that an imposter computer system will be unable to perform this step, since spoof systems have no idea what images are on a user's token, thus users are blocked from accessing fake systems.

As discussed in reference to FIG. 1, each token card image has associated therewith certain random alphanumeric digits (row and column indicia). The user keys in the correct response to the proffered token image, which is the random digits associate therewith.

If the inputted digits (Step 6) are incorrect (Step 7), then in certain embodiments, the server may construct a bogus next screen (Step 8) for accepting from the user their password and secret photo point, however, a user's secret photo will never be shown on this next screen, thus legitimate users reaching this point will understand they have entered an incorrect code, and be given the opportunity to return to Step 5 and enter the correct digits.

The token card may contain a physical explanation of this screen in order to alert users to the bogus nature of the screen in those embodiments of the invention in which the bogus screen is otherwise indistinguishable from the real screen. However, in the presently preferred embodiment, the user will simply realize that they have come to a screen which does not contain the secret photo, so the alert to the user (of the fact that they previously entered an incorrect code) is automatic, and the user will quickly understand that they must return to Step 5 and re-enter the correct digits.

Other embodiments may choose to immediately alert users when incorrect digits are keyed in, and may re-request the correct digits be entered. It should be noted however, that to prevent dictionary attacks, denial of service attacks, and spoofing, preferred embodiments do not immediately alert of incorrect codes, nor do they show different images from a token until such time as it's code has been correctly entered (to prevent an attacker guessing incorrect codes and thus discovering all the different images appearing on a user's token).

The bogus next screens offers an unwitting false user (DoS attacker) the option to seemingly guess the password of the username entered. In reality, as the false user has already failed the token card test, and the screen never accepts logons.

This step has numerous advantages over the prior art methods. Firstly, it prevents a "denial of service" attack in which a nefarious bogus user may input so many guesses at the password that the server eventually locks the account. Secondly, it prevents accidental guessing of the password by the bogus user. Thirdly, it may free up system resources, as the false screens may simply be generated without any actual reference to real security files. Fourthly, it may allow the server computer to begin the process of tracking down the bogus user, as there may not be any password at all in the conventional sense, and thus the time spent guessing a non-existent password may be used to attempt to track down the perpetrator of the attack. Password guessing attacks are also easily recognized, and thus log records can be examined to detect other possibly earlier infiltrated accounts.

Yet another advantage and alternative embodiment of this system is for use with false accounts deliberately set up by an institution in an effort to fool attackers into thinking that they have in fact accessed the system. This may be done in cooperation with security firms, law enforcement, and similar organizations so as to aid in tracking down attackers by means other than noting the repeated failures at the log in stage, for example, by asking a nefarious user to provide information about themselves.

On the other hand, assuming that the real user has correctly identified the random numeral/letter digits associated with the token card image, then the server will display (step 9, and FIG. 3) a multiple image jumble screen having a random assortment of images thereon, arranged in embodiments in a random jumble. The random jumble may be a large composite image, a grid, a row and so on. In preferred embodiments, this screen also contains a password box for users to key in their traditional password.

Note that security is provided to the user as well as to the server. The user may decline continuation of authentication, in the event the computer, or an imposter computer system, is unable to provide any image shown on the card body: display of no proper image will serve as an automatic alert to the user that the server computer may be an imposter system. It may be seen that in embodiments, the lack of a proper image will in fact force the user to confront the fact that something is wrong as they cannot proceed further in the normal manner.

The server computer, via the client computer or terminal, may then accept (Step 10) the password, as well as a location click (i.e. a mouse click, track ball click, or similar pointing device indication of a location) on the secret image, however, merely clicking any point on the image is not in most embodiments sufficient, rather, in the preferred embodiment and best mode now contemplated, the security point, zone, or a narrow zone around the point must now be clicked on. As an example, in a security image of a dog, the user must not only find the dog from among the jumble of images, they must also indicate an exact spot on the image (the nose of the dog, for example) which is the security point.

The server, or an equivalent client program then checks the image and point match. If the match comes up properly, then the server will authenticate (step 12) the user.

On the other hand, if the user mls-clicks, then the device of the invention will not authenticate user (step 11).

FIG. 1 is a diagram of one side of a physical token card according to a second embodiment of the invention, showing the multiple images on the token card and the random row and column headings therewith.

It will be appreciated that the images used in the diagrams are deliberately simplified for clarity, but while in alternative embodiments such images may be used, in the preferred embodiment full color high resolution photo-realistic images are used.

Token card 100 may have thereon front side as well as a rear side (not visible). The token card 100 may have thereon first column and first row and in the best mode now contemplated, may have a plurality of rows and columns, including a second column 101, and a fourth row 102. A small card may easily have between 3 to 5 rows and 4 to 7 columns thereon and yet maintain easy readability for those of normal eyesight, while handicapped versions of the token may have smaller numbers of rows and columns containing individually larger images for individuals with impaired vision.

Second column random indicia 101 is depicted as the three characters "s1F", but it may be a random combination of letters, numbers, spaces, ascii symbols, keyboard characters, keystrokes and so on. Any number of digits which may conveniently fit may in fact be used: one digit, two digits, three, four, five and so on. The digits may be upper and/or lower case as shown, and may or may not be case sensitive when compared for correctness. In embodiments, even fonts, styles, underlining, bold, font colors and other font characteristics might conceivably be used, though such alternatives are not yet standard in actual practice.

Fourth row random indicia 102 "Fzs" is similar to the column indicia, and it will be appreciated that the two sets of indicia are unique to the image 103 at intersection of the second row and fourth column. In each case, a token card may be completely unique, partially unique, or may be a copy of another token card. However, it will be appreciated that the closer the card is to completely unique, the greater security is. As multiple copies of token cards are generated, security degrades. In compromise embodiments, some images from a large collection of very many images may be selected and may occasionally overlap in use from a first card to a second card, but the location of the images may be different from card to card, as may be the indicia. It will be understood that the number of permutations of images, image locations, and random indicia of columns and rows is very large, up to 84 binary bits (1.9E25) or higher.

Randomly selected image 103, and 202 may be the image which the server selects on any given instantiation of the invention, and may vary from challenge to challenge. In preferred embodiments, selection of random images is done such that no image is repeated until all token images have been shown, at which point a user may be provided an option to discard their "used" token and commence using a previously supplied new one, in order that potential stolen token codes never repeat.

Note that the user may also have a secret security 304 image, which may have a secret security point 305 thereon, for later steps in the authentication process. However, that secret image need NOT be present on the card. For convenience, it may be on the card, and the secret security point may be indicated thereon, however, this obviously degrades security again, as the secret security image and point function to prevent a bogus user who obtains the physical card from being able to access the real user's account.

Figure 3:
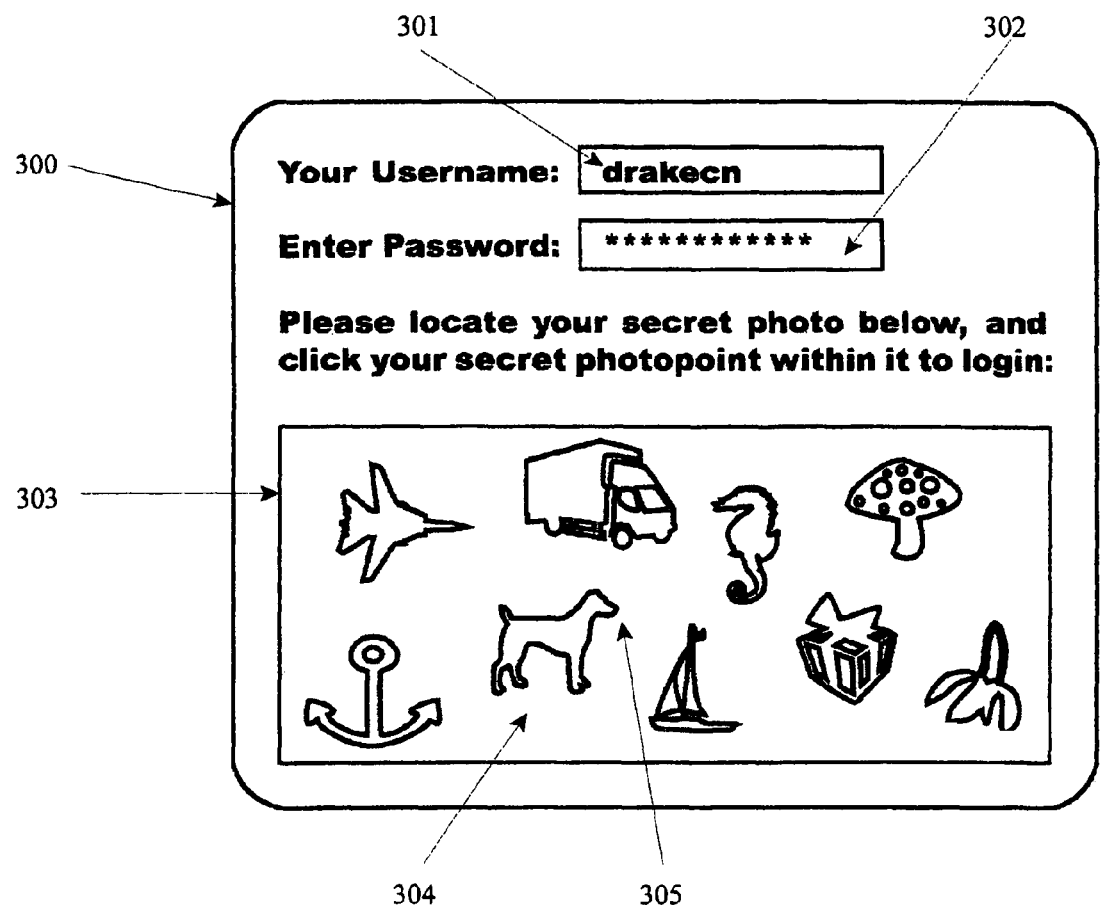
FIG. 3 is a diagram of an example login screen utilizing a secret photo point, as according to an embodiment of the invention. It depicts a computer screen showing a display box indicating a user's username, an input box for entry of their traditional password, and a jumble of multiple random images, including a picture of a dog (which is the example user's secret login login photo, the dogs nose being the example user's secret photo point).

FIG. 3 is a screen 200 according to a fourth embodiment of the invention, offering the user 201 the option to enter 203 the row and column codes associated with one of the images 202 displayed. This is a simple screen, merely displaying 202 an image 103 from the token 100, and a box 203 into which a user keys the associated row and column indicia.

FIG. 3 is a diagram 300 of a photo-point matrix for an example user 301 showing multiple random images 303 (a jumble of images) on a computer screen, including a single correct image 304 having a single valid "hit zone" 305 point for authentication, and an input area for the user's traditional password 302 or other identifying information. (Identifying information from such user may be in the form of one member selected from the group consisting of: a cookie, a token, an email address, a username or combinations thereof.)

Secret image 304 may be displayed, with or without distractor images, and the user may use a pointing device to place cursor at the actual secret point 305 in order to be authenticated.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A computer security device of the physical token type, comprising:
   a card body of durable material, the card body having at least first and second sides, at least one side of the body having thereon at least first and second columns and at least first and second rows intersecting the first and second columns;
   each column having a different random indicia heading associated therewith, each row having a different random indicia heading associated therewith, whereby at least four intersections of the rows and columns are provided upon the card body, and where the set of said random indicia headings are unique to said token and not associated with any other token; and
   each intersection having thereat a unique image selected at random by an issuing entity.

2. The computer security device of claim 1, wherein the card body has a length and a width, the length and width selected to fit inside standard wallet compartments.

3. The computer security device of claim 2, wherein the length is 3 and ⅜ inches and the width is 2 and ⅛ inches.

4. A method of authentication of a computer to a user, and a user to a computer, the method comprising:
   a) generating a physical computer security token device with dimensions suitable for storage in a wallet or purse by an issuing entity that selects rows and columns of random photographs never before issued identically to a previous token device, and said issuing entity selecting random row and column labels also never before issued identically to a previous token device, and providing said token device showing said random photographs and labels to said user;
   b) displaying for said user a username-screen, for accepting from said user a first username;
   c) displaying for said user a token-screen having thereon at least one of the photographs shown on said token device, the token-screen requesting input of the random row and column labels associated with the displayed photograph;

d) allowing said user to decline continuation of authentication, if no photograph shown on the token matches any image displayed in step c);

e) comparing the inputted labels with those known by the issuing entity to identify the token photograph that was shown to said user; and f) if the labels matches, then accepting this authentication request from said user, or, proceeding to additional authentication steps.

5. The authentication method of claim 4, further comprising the steps of:

b1) before providing the username-screen of step b), first checking for the existence of persistent identifying information such as a cookie, bookmark, or client certificate on the user's computer;

b2) using such persistent identifying information to derive the user's username without requiring the user to key it in; and b3) skipping step b) and proceeding directly to step c).

6. The method of authentication of claim 4, wherein step b) further comprises: additionally accepting from such user a password.

7. A computer security device of the physical token type, comprising:

a card body of durable material, the card body having at least first and second sides, one or more sides of the body having thereon at least first and second columns and at least first and second rows intersecting the first and second columns, whereby at least four intersections of the rows and columns are provided upon the card body;

each intersection having thereat a unique photograph selected at random by an issuing entity from a large collection of very many images; and each said photograph identified uniquely with individual random indicia associated thereto with said random indicia having been selected by an issuing entity.

8. The computer security device of claim 7, wherein the card body has a length and a width, the length and width selected to fit inside standard wallet or purse compartments.

9. The computer security device of claim 7, wherein the length is 3 and ⅜ inches and the width is 2 and ⅛ inches.

10. A physical computer security token device with dimensions suitable for storage in a wallet or purse comprising:

a) rows and columns of random photographs shown thereon and selected by an issuing entity and chosen such that no two different computer security tokens appear the same; and b) row and column labels shown thereon comprising random alphanumeric characters or other computer keyboard characters selected by an issuing entity and chosen such that no two different computer security tokens appear the same.

11. A two-way authentication method for authenticating a computer to a user as well as authenticating said user to said computer, the method comprising:

a) providing to said user a physical second-factor computer security token device depicting small different photographs selected at random by an issuing entity and arranged into a grid of rows and columns each labeled by printed alphanumeric characters also selected at random by said issuing entity such that every individual token device has a different grid of photos with different labels to every other token device;

b) activating a first login sequence step to collect from said user identifying information in the form of a cookie, a token, an email address, a username or combinations thereof;

c) displaying to the user a second login sequence step, said display including the reproduction of one of said random photographs shown on said user's token device;

d) allowing said user to decline continuation of authentication in the event an imposter computer system provides a photograph not printed on said token device;

e) accepting as input from said user the random row and column label characters from said token device indicated by the photograph displayed in step (c); and f) comparing said user's input with the issuing entity's known labels for said users said token, and in the case of match, accepting the authentication request or proceeding to additional authentication steps.

* * * * *

UNITED STATES PATENT AND TRADEMARK OFFICE
CERTIFICATE OF CORRECTION

| | | |
|---|---|---|
| PATENT NO. | : 8,176,332 B2 | Page 1 of 1 |
| APPLICATION NO. | : 11/707590 | |
| DATED | : May 8, 2012 | |
| INVENTOR(S) | : Christopher Nathan Drake | |

It is certified that error appears in the above-identified patent and that said Letters Patent is hereby corrected as shown below:

Title Page, Item (76) Inventor, the correct address for Christopher Drake is Noosaville, QLD, AU.

Signed and Sealed this
Second Day of October, 2012

David J. Kappos
*Director of the United States Patent and Trademark Office*